United States Patent Office 3,197,492
Patented July 27, 1965

3,197,492
STABLE LEAD ALKYL COMPOSITIONS AND A METHOD FOR PREPARING THE SAME
Wilford H. Thomas and Shirl E. Cook, Baton Rouge, La., assignors to Ethyl Corporation, New York, N.Y., a corporation of Virginia
No Drawing. Filed Apr. 13, 1964, Ser. No. 359,406
15 Claims. (Cl. 260—437)

This application is a continuation-in-part of Serial No. 200,934, filed June 8, 1962, now abandoned.

This invention relates to alkyllead compositions which are stable at temperatures above 100° C. It also relates to methods for inhibiting the thermal decomposition of alkyllead compounds when subjected to temperatures above 100° C., at which temperature thermal decomposition becomes appreciable.

Generally this invention contemplates inhibiting the thermal decomposition of alkyllead compounds in which at least one valence of the lead is satisfied by an alkyl radical.

More specifically, this invention is concerned with an improved process for separating alkyllead compounds from the reaction products accompanying their synthesis. It is also applicable to a method for inhibiting thermal decomposition of an alkyllead product during its purification and blending with other products in making commercial antiknock fluids. It is applicable to minimizing the possibility of thermal decomposition during storage or transportation of an alkyllead product. It is especially applicable to preventing thermal decomposition of undiluted alkyllead compounds where the likelihood of thermal decomposition is more of a problem.

As is well known, tetraalkyllead antiknock compounds generally are produced by reacting a sodium-lead alloy with an alkyl halide. Due to recent marked improvements in the technology of alkyllead manufacutre, thermal instability of alkyllead compounds during synthesis is no longer a problem. However, the tetraalkyllead compound so produced is in admixture with various reaction by-products from which it must be separated. Separation is effected by steam or vacuum distillation with subsequent purification of the tetraalkyllead distillate. Due to the toxic and unstable nature of tetraalkyllead antiknock compounds, these distillation and purification operations are subject to many difficulties.

In these distillation and purification operations meticulous temperature control and exact safety measures are of paramount importance. The rate of decomposition of the alkyllead compound increases rapidly with small rises in temperature above the temperature where thermal decomposition becomes appreciable. For example, decomposition of tetraethyllead occurs at the rate of approximately 2 percent per hour at a temperature of 100° C., which is the customary temperature used in separating tetraethyllead from the reaction products accompanying its synthesis. At temperatures above 100° C., the decomposition rate increases logarithmically so that a point is soon reached where external heat is no longer required and decomposition becomes selfpropagating.

Such likelihood of excessive decomposition is present also during blending, handling, storage, and transportation. Prior to diluting the alkyllead concentrate with scavengers, gasoline or other materials, the alkyllead compound remains a concentrate and the problem of excessive thermal decomposition exists, even though the temperature is maintained normally well below that of decomposition. For example, in the purification step wherein the tetraethyllead concentrate is washed and blown with air at atmospheric temperature to remove impurities, a sudden increase in temperature may occur due to the oxidation of triethylbismuth which is present as an impurity. Also pumps used in handling tetraethyllead occasionally "freeze" and the friction developed may cause a local overheating to a temperature above the temperature of decomposition of the tetraethyllead. Faulty wiring, leaks onto steam pipes, and other accidental causes also may produce local overheating with resulting dangerous decomposition.

It is seen therefore that in those operation where an alkyllead compound is in the undiluted or concentrated state—viz. separation, purification, blending, transportation, and storage—the likelihood of excessive thermal decomposition must be provided for and effectively combatted.

An object of this invention is to stabilize alkyllead compounds against thermal decomposition during one or more of the following operations: separation, purification, blending, transportation and storage.

The above and other objects of this invention are accomplished by incorporating with alkyllead compounds a relatively small quantity of a mono-hydrocarbon substituted cycloalkene (e.g., a methylcycloalkene) in which the ring contains 6–7 carbon atoms (i.e., any single monohydrocarbon substituted cyclohexene or mono-hydrocarbon substituted cycloheptene or a mixture of two or more of such compounds).

The preferred mono-substituted cycloalkene hydrocarbons contain from 7 up to about 14 carbon atoms in the molecule because these compounds are most readily available at the lowest cost and include exceptionally effective thermal stabilizers.

The foregoing objects are also accomplished by conducting one or more of the foregoing operations in the presence of the mono-hydrocarbon substituted cycloalkene thermal stabilizer. Generally speaking, excellent results in protecting the alkyllead compound against premature alkyllead decomposition are achieved when the concentration of the mono-hydrocarbon substituted cycloalkene is from about 5 to about 50 percent based on the weight of the alkyllead compound being protected. It will be understood, however, that departures from this concentration range may be made if the conditions of service or storage justify such departures. In all cases excellent thermal stabilization is achieved. The preferred concentration for the thermal stabilizer of this invention ranges from about 5 to about 30 weight percent based on the weight of the alkyllead compound since within this range very effective thermal stability subsists even though the alkyllead compound be subjected to the high temperature of 195° C. for long periods of time. Accordingly, this constitutes a preferred embodiment of this invention.

The thermal stabilizers of this invention are characterized by containing a cyclohexene or cycloheptene ring which is substituted with a hydrocarbon group or radical which itself contains from 1 to about 7 or 8 carbon atoms. This hydrocarbon substituent is most preferably an alkyl (e.g., methyl), an alkenyl (e.g., vinyl) or an aryl (e.g., phenyl) group although equivalent hydrocarbyl substituents may be present.

An exceedingly novel feature of this invention is the discovery that the hydrocarbon (e.g., methyl) group on the cyclohexene or cycloheptene ring confers upon the compound a marked improvement in its ability to protect the alkyllead compound against the ravages of premature thermal decomposition. It has been experimentally verified that various mono-hydrocarbon substituted cyclohexene and cycloheptene compounds are substantially more effective in this respect than cyclohexene itself. Ergo, it follows that the presence of the hydrocarbon group on the ring in some currently unexplainable manner confers upon the molecule a very desirable character which could not have been predicted on the basis of available scientific theory. The sharp difference in effectiveness as between the hydrocarbon substituted cycloalkene thermal stabilizers of this invention on the one hand, and the previously known cyclohexene thermal stabilizer on the other, will become more apparent from the experimental results presented hereinafter.

The methylcyclohexenes are generally preferable for use in this invention from the cost and availability standpoints.

Examples of thermal stabilizers of this invention include 1-methylcyclohexene-1, 3-methylcylohexene-1, 4-methylcyclohexene-1, 1-ethylcyclohexene-1, 3-propylcyclohexene-1, 4-tert-butylcyclohexene-1, 3-pentylcyclohexene-1, 4-(2-hexyl)cyclohexene-1, 4-(1,1,3,3-tetramethylbutyl)cyclohexene-1, 3-vinylcyclohexene-1, 4-vinylcyclohexene-1, 3-allylcyclohexene-1, 4-propenylcyclohexene-1, 1-phenylcyclohexene-1, 3-p-tolylcyclohexene-1, 1-methylcycloheptene - 1,3 - methylcycloheptene-1,4-methylcycloheptene-1, 5-methylcycloheptene-1, 1-ethylcycloheptene-1, 4-ethylcycloheptene-1, 3-propylcycloheptene-1, 4-tert-butylcycloheptene-1, 3-pentylcycloheptene-1, 4-(2-hexyl)cycloheptene-1, 3-vinylcycloheptene-1, 4-vinylcycloheptene-1, 3-allylcycloheptene-1, 4-propenylcycloheptene-1, 1-phenylcycloheptene-1, 3-o-tolylcycloheptene-1, and the like.

The chief thermal decomposition products of alkyllead compounds are lead metal and hydrocarbon gas. Hence, a very good index of alkyllead thermal decomposition is liberation of this gas.

To illustrate the effectiveness of this invention, a series of direct comparisons were made of the decomposition characteristics of unstabilized and stabilized tetraethyllead samples. A thermostatically controlled hot oil bath was fitted with a stirrer, thermometer, and a holder for a small reaction tube. A 100 cc. gas buret beside the bath, and equipped with a water-containing levelling bottle, was connected by means of rubber tubing with the reaction tube after the desired sample was introduced into this tube. After the bath was brought to a steady temperature of 195° C., the sample-containing tube was quickly immersed in the bath and clamped with the levelling bottle adjusted to hold the gas buret in place at a zero reading. Then measured was the time during which the sample was held at 195° C. without pronounced thermal decomposition and consequent gas evolution occurring. Thus, the longer the time, the more thermally stable was the alkyllead composition.

With pure tetraethyllead used in 1 ml. amounts, pronounced thermal deterioration occurred almost immediately as evidenced by rapid gas evolution. In fact, the decomposition of unstabilized tetraethyllead will normally become uncontrollable if it is heated, whether rapidly or slowly, to even 130° C., unless it is possible to very rapidly cool it down to about 100° C. or below.

The remainder of the compositions tested in the manner described above and the results thereby obtained are shown in the following table.

TABLE.—EFFECT OF ADDITIVES ON THERMAL DECOMPOSITION OF ALKYLLEAD COMPOUNDS AT 195° C.

| No. | Additive | Additive Conc., Wt. Percent of TEL | Thermal Stability Time to Decomposition, Minutes |
|---|---|---|---|
| 1 | 4-Methylcyclohexene-1 | 5 | 58 |
| 2 | Cyclohexene | 5 | 4 |
| 3 | 4-Methylcyclohexene-1 | 15 | 210 |
| 4 | Cyclohexene | 15 | 6 |
| 5 | 1-Methylcycloheptene-1 | 5 | 14 |
| 6 | ---do--- | 15 | 22 |
| 7 | 3-Methylcyclohexene-1 | 5 | 7 |
| 8 | ---do--- | 20 | 190 |
| 9 | 4-Vinylcyclo-hexene-1 | 5 | 9 |
| 10 | ---do--- | 30 | >180 |
| 11 | 1-Phenylcyclohexene-1 | 5 | 116 |
| 12 | ---do--- | 10 | >220 |
| 13 | 1-Methylcyclohexene-1 | 5 | 6 |
| 14 | ---do--- | 20 | >300 |

It will be seen by comparing Runs 1 and 2 that one of the methylcyclohexenes of this invention when utilized at a concentration of 5 percent by weight was an order of magnitude more effective than the same quantity of cyclohexene, an alkyllead thermal stabilizer disclosed in U.S. Patents 2,660,591–596. The same observation can be made when comparing the results of Runs 3 and 4, in this instance the methylcyclohexene being 35 times as effective as the cyclohexene. In fact, it will be noted by comparing Run 1 with Run 4, that 5 percent of the 4-methylcyclohexene-1 when used in accordance with this invention was an order of magnitude more effective than 300 percent as much of the prior art cyclohexene. By the same token 1-methylcyclohexene-1 at 5 percent (Run 13) was as effective as 300 percent as much of the prior art cyclohexene (Run 4). From Runs 4 and 7, it is clear that 5 percent of 3-methylcyclohexene-1 was even more effective than 300 percent as much of the prior art cyclohexene. Furthermore, 5 percent of 4-vinylcyclohexene-1 (Run 9) was 150 percent as effective as 300 percent as much of the prior art cyclohexene (Run 4). From Run 11, it is clear that 5 percent of 1-phenylcyclohexene-1 was 29 times as effective as the same concentration of cyclohexene (cf. Run 2). Such a sharp improvement in effectiveness can only be attributed to the presence of the substituent on the cyclohexene ring and available scientific knowledge would not have afforded any basis for having predicted such advantageous behavior. A comparison between Runs 2 and 5 and between Runs 4 and 6 shows that a methylcycloheptene of this invention (in this case 1-methylcycloheptene-1) was over 300 percent as effective as cyclohexene. In fact, 5 percent of the methylcycloheptene (Run 5) was over twice as effective as 300 percent as much cyclohexene (Run 4).

The above-described beneficial behavior of the thermal stabilizers of this invention also takes place with other alkyllead compounds such as triethyllead bromide and tetrapropyllead. In fact, these compounds when stabilized can be boiled and distilled at atmospheric pressure.

This invention is adapted to the stabilization of tetraethyllead and other alkyllead compounds at various stages after they have been formed and the diluents or excess alkyl halide have been discharged from the autoclave. For example, one of the above thermal stabilizers may be added in appropriate quantity to the alkyllead reaction concentrate just before the separation step which is conducted at a temperature close to the temperature where hazardous run-away decomposition is particularly prevalent. By adding one of the above thermal stabilizers to the reaction concentrate just prior to distillation, the danger arising from unexpected temperature increases is substantially eliminated.

Most preferably the above thermal stabilizers are employed to stabilize the alkyllead compound both in storage and in shipping and especially to stabilize any alkyllead concentrate, e.g., compositions containing at least 80 percent by weight of alkyllead compound. If elevated temperature conditions are likely to be encountered, the addition of a small amount of thermal stabilizer to the alkyllead compound will economically and satisfactorily eliminate most of the hazard involved. While meticulous temperature control and exacting safety measures have been successful in reducing to a minimum the hazards of processing and handling of tetraethyllead, the use of this invention provides a much greater factor of safety. Furthermore, waste of the alkyllead product due to decomposition is considerably minimized through the use of this invention.

This invention is useful in stabilizing alkyllead compounds in which at least one valence of the lead is satisfied by an alkyl radical. For example tetraethyllead, tetramethyllead, tetrapropyllead, dimethyldiethyllead, triethylphenyllead, and triethyllead bromide can be successfully stabilized against thermal decomposition by incorporating therein a relatively small quantity of one of the thermal stabilizers of this invention. This invention is particularly well suited to the stabilization of any mixture involving two or more of the following compounds: tetramethyllead, ethyltrimethyllead, diethyldimethyllead, triethylmethyllead, and tetraethyllead.

While this invention has been discussed with reference to the utilization of mono-hydrocarbon substituted cyclohexenes or cycloheptenes in any of their isomeric forms, or mixtures of such forms, or mixtures of each other, the same high order of effectiveness subsists when utilizing polyhydrocarbon substituted cyclohexene and cycloheptene hydrocarbons, especially those in which the rings are substituted with up to 4 methyl and/or ethyl groups. Accordingly, the use of polyalkylated cyclohexenes and cycloheptenes either singly or in admixture with each other falls within the spirit, scope and ambit of this invention. Typical of these polyalkylated cycloalkene compounds are 3,4-dimethylcyclohexene; 3-methyl-5-ethylcyclohexene; 1,3,5-trimethylcyclohexene; 3,4,5-triethylcyclohexene; 3,4,6-tri-n-propylcyclohexene; 3-methyl-4,6-di-n-propylcyclohexene; 3,4,5-trimethyl-6-n-butylcyclohexene; 3-ethyl-6-isopropylcyclohexene; 3-i-butyl-4-methylcyclohexene; 3-i-propyl-6-t-butylcyclohexene; 3,5-di-i-propylcyclohexene; 3,5-dimethylcycloheptene; 4,6-diethylcycloheptene; 3,5,7-trimethylcycloheptene; mixtures of such materials; mixtures of one or more of such polyalkylated compounds with a mono-hydrocarbon substituted cyclohexene or cycloheptene; and the like. These thermal stabilizers are effective when diluted with other hydrocarbons.

We claim:
1. A method of inhibiting the decomposition of an alkyllead compound at temperatures of from about 100° C. to about 195° C. which comprises incorporating with said compound from about 5 to about 30 weight percent based on the weight of said compound of a mono-hydrocarbon substituted cyclomonoalkene hydrocarbon in which the ring contains 6–7 carbon atoms and in which the molecule contains from 7 to about 14 carbon atoms.

2. The method of claim 1 wherein the concentration of said cyclomonoalkene is from about 5 to about 15 weight percent based on the weight of said alkyllead compound.

3. In the process of producing an alkyllead compound by reacting a sodium lead alloy with alkyl chloride and separating the thus produced alkyllead compound from the reaction mass by steam distillation, the step which comprises conducting said steam distillation in the presence of from about 5 to about 30 weight percent based on the weight of said compound of a mono-hydrocarbon substituted cyclomonoalkene hydrocarbon in which the ring contains 6–7 carbon atoms and in which the molecule contains from 7 to about 14 carbon atoms.

4. The process of claim 3 wherein the concentration of said cyclomonoalkene is from about 5 to about 15 weight percent based on the weight of said alkyllead compound.

5. A concentrated alkyllead compound with which has been blended from about 5 to about 30 weight percent based on the weight of said compound of a mono-hydrocarbon substituted cyclomonoalkene hydrocarbon in which the ring contains 6–7 carbon atoms and in which the molecule contains from 7 to about 14 carbon atoms.

6. The composition of claim 5 wherein the concentration of said cyclomonoalkene is from about 5 to about 15 weight percent base on the weight of the alkyllead compound.

7. The composition of claim 5 wherein said compound is selected from the group consisting of tetramethyllead, ethyltrimethyllead, diethyldimethyllead, triethylmethyllead, tetraethyllead, and mixtures thereof.

8. The composition of claim 5 wherein said cyclomonoalkene is a methyl substituted cyclomonoalkene.

9. The composition of claim 5 wherein said cyclomonoalkene is a methylcyclohexene.

10. The composition of claim 5 wherein said cyclomonoalkene is 4-methylcyclohexene-1.

11. The composition of claim 5 wherein said cyclomonoalkene is 3-methylcyclohexene-1.

12. The composition of claim 5 wherein said cyclomonoalkene is 1-methylcyclohexene-1.

13. The composition of claim 5 wherein said cyclomonoalkene is 4-vinylcyclohexene-1.

14. The composition of claim 5 wherein said cyclomonoalkene is 1-phenylcyclohexene-1.

15. The composition of claim 5 wherein said cyclomonoalkene is 1-methylcycloheptene-1.

No references cited.

TOBIAS E. LEVOW, *Primary Examiner.*